United States Patent
Effern et al.

(10) Patent No.: US 8,886,596 B2
(45) Date of Patent: Nov. 11, 2014

(54) METHOD FOR REORGANIZING OR MOVING A DATABASE TABLE

(75) Inventors: Arndt Effern, Sinsheim-Duehren (DE);
Frank-Martin Haas, Wiesloch (DE);
Torsten Ziegler, Dielheim (DE)

(73) Assignee: SAP SE, Walldorf (DE)

( * ) Notice: Subject to any disclaimer, the term of this patent is extended or adjusted under 35 U.S.C. 154(b) by 207 days.

(21) Appl. No.: 12/901,853

(22) Filed: Oct. 11, 2010

(65) Prior Publication Data
US 2012/0089566 A1  Apr. 12, 2012

(51) Int. Cl.
*G06F 17/30* (2006.01)
(52) U.S. Cl.
CPC .... *G06F 17/30377* (2013.01); *G06F 17/30297* (2013.01)
USPC .......................................... 707/611; 707/610
(58) Field of Classification Search
CPC . G06F 17/30581; G06F 3/065; G06F 3/0647; G06F 3/683; G06F 17/30575; G06F 17/30297; G06F 17/30377; G06G 17/30575
USPC .................................................. 707/610, 611
See application file for complete search history.

(56) References Cited

U.S. PATENT DOCUMENTS

| | | | |
|---|---|---|---|
| 7,523,142 B2 | 4/2009 | Driesen et al. | |
| 2003/0115438 A1* | 6/2003 | Mahalingam et al. | 712/1 |
| 2003/0225742 A1* | 12/2003 | Tenner et al. | 707/2 |
| 2004/0083245 A1* | 4/2004 | Beeler, Jr. | 707/204 |
| 2006/0212746 A1* | 9/2006 | Amegadzie et al. | 714/6 |
| 2007/0027935 A1* | 2/2007 | Haselton et al. | 707/204 |
| 2007/0168316 A1* | 7/2007 | Gupta et al. | 707/1 |
| 2007/0198524 A1* | 8/2007 | Branda et al. | 707/10 |
| 2008/0071999 A1* | 3/2008 | Boyd et al. | 711/154 |
| 2009/0150461 A1* | 6/2009 | McClanahan | 707/204 |
| 2009/0150462 A1* | 6/2009 | McClanahan et al. | 707/204 |
| 2010/0088281 A1 | 4/2010 | Driesen et al. | |
| 2010/0114831 A1* | 5/2010 | Gilbert et al. | 707/648 |
| 2010/0138440 A1 | 6/2010 | Driesen | |
| 2010/0138821 A1 | 6/2010 | Driesen et al. | |
| 2010/0153341 A1 | 6/2010 | Driesen et al. | |
| 2010/0162226 A1 | 6/2010 | Borissov et al. | |

FOREIGN PATENT DOCUMENTS

| | | | |
|---|---|---|---|
| EP | 2175365 A1 | 4/2010 | |
| EP | 2194467 A1 | 6/2010 | |
| EP | 2199932 A1 | 6/2010 | |

* cited by examiner

*Primary Examiner* — Rehana Perveen
*Assistant Examiner* — Tiffany Thuy Bui
(74) *Attorney, Agent, or Firm* — Brake Hughes Bellermann LLP

(57) ABSTRACT

A computer system including instructions recorded on a non-transitory computer-readable storage medium and readable by at least one processor may include a table generator module, a table updater module, and a data replicator module. The table generator module may be configured to cause the at least one processor to generate a target table. The table updater module may be configured to cause the at least one processor to modify data in the target table synchronously with data being modified in a source table. The data replicator module may be configured to cause the at least one processor to replicate the data contained in the source table in the target table.

17 Claims, 7 Drawing Sheets

METHOD FOR REORGANIZING OR MOVING A DATABASE TABLE

TECHNICAL FIELD

This description relates to the reorganizing or moving of a database table.

BACKGROUND

At times, database tables need to be reorganized or moved from one physical location to another physical location. For example, database tables may need to be reorganized or moved from one location to another to (a) change the table storage attributes, (b) change the data types, (c) drop or add columns, (d) reclaim space used by the table, or (e) relocate objects.

The accessibility of the database table during a reorganization or move may be limited. For database tables that are frequently used or used by many users it can be challenging if not impossible, to schedule a time to reorganize or move the database tables.

Some database vendors include procedures or functions for reorganizing or moving a database table. For example, the procedures or functions for reorganizing or moving a database table that some database vendors provide include a staging area for tracking the modifications that are made to a source or original table while the data of the source table is being reorganized or moved to a target or new table. After the data of the source table has been replicated in the target table, all of the modifications that were made to the source table during the move (and stored in the staging area) are replayed to the target table. Thus, there is a delay between the time that the data is changed in the source table and the replicating of the change in the target table.

In cases where changes are made to the data of the source table during the replay process, multiple iterations of the replay process are required. In some cases, for example, where the data in the source table is being modified frequently, the process would be an endless process (i.e., in each iteration the data is being modified in the source table faster than the replay processes can be completed). In such cases, an undesirable system downtime must be scheduled.

These procedures or functions for reorganizing or moving a database table can have many additional disadvantages. For example, (1) the staging area that is used to track the changes made to data of the source table takes up disk or memory space, (2) since the modifications to the data of the source table and stored in the staging area need to be replayed to the target table, it is required that the reorganization or move of the table to be completed as quickly as possible, and (3) the source table must be locked to switch to the source table with the target table, which can be problematic for source tables which are in frequent or constant use. Additionally, in some cases the source table must be locked during the replay phase, which can cause data inconsistencies and/or delays in the use of the source table.

Accordingly, there is a need for more efficient methods for reorganizing or moving database tables.

SUMMARY

According to one general aspect, a computer system includes instructions recorded on a non-transitory computer-readable storage medium and readable by at least one processor. In one embodiment, the computer system may include a table generator module, a table updater module, and a data replicator module. The table generator module may be configured to cause the at least one processor to generate a target table. The table updater module may be configured to cause the at least one processor to modify data in the target table synchronously with data being modified in a source table. The data replicator module may be configured to cause the at least one processor to replicate the data contained in the source table in the target table.

According to another general aspect, a computer-implemented method for causing at least one processor to execute instructions is recorded on a computer-readable storage medium. In some embodiments, the method includes (1) generating a target table, (2) modifying data in the target table synchronously with data being modified in a source table, and (3) replicating the data contained in the source table in the target table.

According to another general aspect, a computer program product, the computer program product being tangibly embodied on a computer-readable medium and comprising instructions that, when executed, are configured to cause at least one processor to (1) generate a target table, (2) modify data in the target table synchronously with data being modified in a source table, and (3) replicate the data contained in the source table in the target table.

The details of one or more implementations are set forth in the accompanying drawings and the description below. Other features will be apparent from the description and drawings, and from the claims.

DETAILED DESCRIPTION

Figure 1:
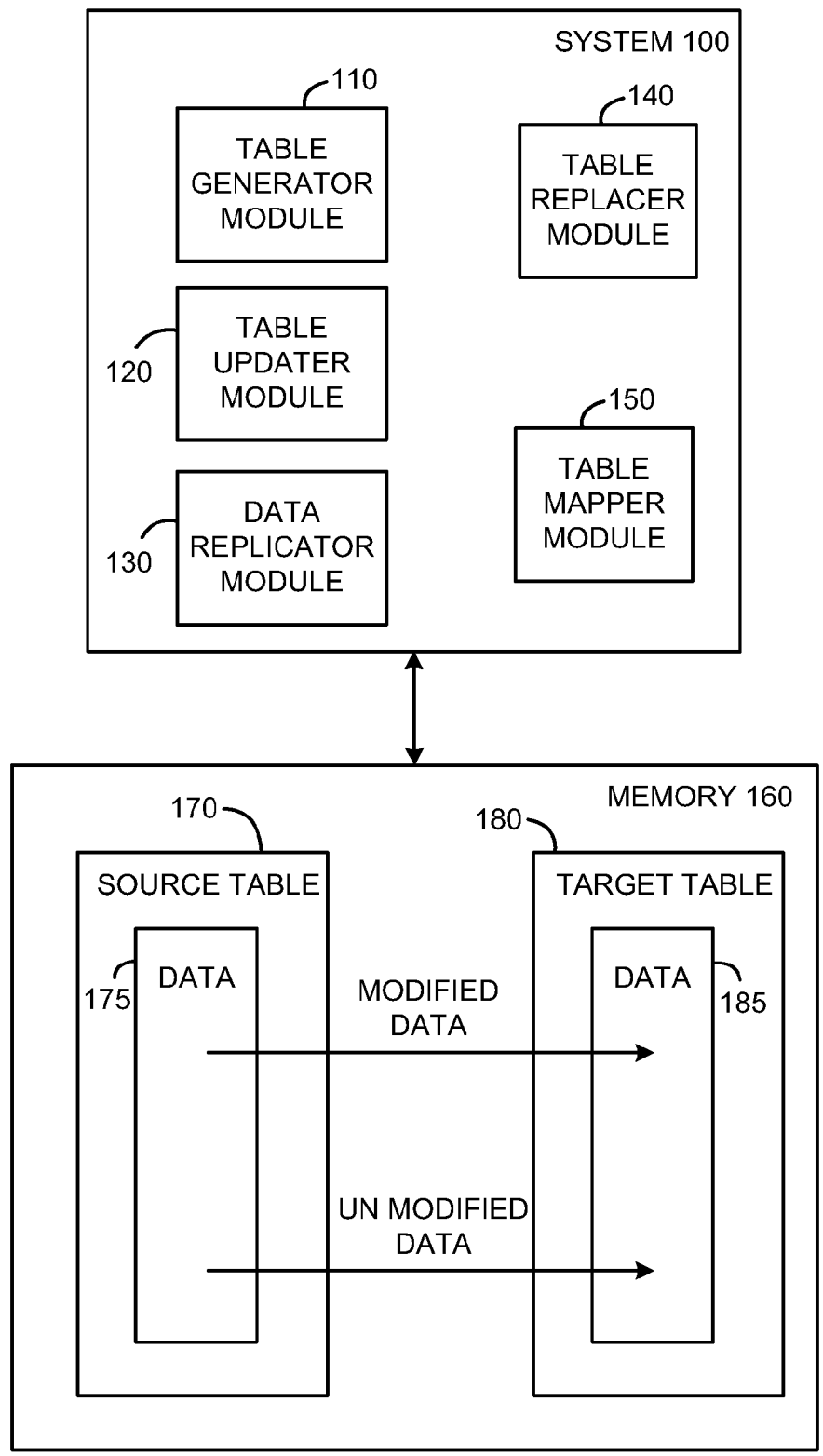
FIG. 1 is a block diagram of a system for reorganizing or moving a database table.

FIG. 1 is a block diagram of a system 100 for reorganizing or moving a database table. The system 100 may be used to reorganize or move a database table for a variety of reasons. For example, the database table may be reorganized or moved (1) to change the table storage attributes, (2) to change the data type, (3) to drop or add columns to the table, (4) to reclaim space, and/or (5) to relocate objects of the database. In some embodiments, the system 100 is a database management system or included within a database management system. In other embodiments, the system 100 is configured to work in connection with a database management system.

The system 100 may be used to change the table storage attributes. For example, storage attributes or parameters of a table or tablespace determine how table objects are stored physically on a memory or on a disk. Exemplary attributes include, but are not limited to, table extent size, table status flags, clustering directives, and partitioning information.

The system 100 may be used to change data types within the table. For example, it may be necessary to change a data type of a table or a column field length because of an application upgrade.

The system 100 may be used to drop columns from or add columns to the database table. For example, after a large deletion from a database table, the system 100 may be used to reclaim the space that was used by the deleted data.

The system 100 may be used to relocate objects of the database table. For example, to improve bandwidth or accelerate backup and restore processes a database table may be reorganized or moved to a new location. Specifically, a database table may be moved from one location or memory to another location or memory.

The system 100 includes a table generator module 110, a table updater module 120, a data replicator module 130, a table replacer module 140, and a table mapper module 150.

In some embodiments, one or more portions of the components or modules of the system 100 illustrated in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the table updater module 120 can be, or can include, a software module configured for execution by at least one processor (not shown). Similarly, one or more portions of the data replicator module 130 or the table converter module 110 can be a software module configured for execution by at least one processor (not shown). In some embodiments, the functionality of the modules or components can be included in different modules and/or components than those shown in FIG. 1. For example, although not shown, the functionality of the table generator module 110 can be included in a different module than the table generator module 110, or can be divided into several different modules.

In some embodiments, the processor is a device that is configured to fetch instructions, to execute instructions and/or to access and communicate with a memory. In some embodiments, the processor is one of multiple processors in a system. In some embodiments, the processor is an FPGA and/or is incorporated into one of the modules.

In one embodiment, the table generator module 110 is configured to cause the processor to generate a target table 180. In some embodiments, the target table 180 is configured or created with the same structure as the source table 170.

In some embodiments, the target table 180 is given storage attributes that are different than the storage attributes of the source table 170. For example, in some embodiments, the table generator module 110 is configured to cause the processor to generate a target table 180 that has a different extent size, different table status flags, different clustering directives, and/or different partitioning information than the source table 170.

In some embodiments, the target table 180 is configured to store data of a different type than the source table. For example, in some embodiments, the table generator module 110 is configured to cause the processor to generate a target table 180 that can store data of a different type than the data stored in the source table 180. In another embodiment, the table generator module 110 is configured to cause the processor to generate a target table 180 that includes column field lengths that are different than the field lengths of the source table 170.

In some embodiments, the table generator module 110 is configured to cause the processor to generate the target table 180 that is stored at a different location than the source table 170. For example, although the target table 180 and the source table 170 are illustrated in FIG. 1 as being in the same memory 160, in some embodiments, the table generator module 110 is configured to cause the processor to generate the target table 180 that is stored is a memory that is different than the memory that stores the source table 170.

As described herein a memory can be implemented as more than one memory component (e.g., more than one random-access memory (RAM) component or disk drive memory) a local device. In some embodiments, the memory can be, or can include, a non-local memory (e.g., a memory not physically included within the local device) on a client side of a network. For example, the memory can be, or can include, a memory shared by multiple devices (not illustrated) on the client side of a network. In some embodiments, the memory can be associated with a server device (not illustrated) on the client side of network and configured to serve several devices on the client side of the network.

In some embodiments, the table updater module 120 is configured to cause the at least one processor to modify data in the target table 180 synchronously with data being modified in the source table 170. In other words, as data 175 is modified in the source table 170, for example, by a user of the source table 170, the data 185 is synchronously or directly updated or modified in the target table 180.

As the data 185 in the target table 180 is updated or modified synchronously with the data 175 being modified in the source table 170 or in real time, there is no need for a staging area for the changes to the data of the source table to be tracked. Thus, there is no need to form an additional table (the staging area) that would require disk space. Additionally, there is no need for a replay phase to occur to update the data in the target table (and subsequent tracking of changes to the data in the source table and subsequent replay phases).

In some embodiments, the table updater module 120 includes triggers that cause the data that is changed in the source table 170 to be changed or updated in the target table 180. For example, in some embodiments, the table updater module 120 includes three triggers, an insert trigger, an updated trigger, and a delete trigger. In such an embodiment, when data is inserted into the source table 170, the insert trigger is activated or provoked and the data that was inserted into the source table 170 is at that time and directly inserted into the target table 180. When the data in the source table 170 is updated, the updated trigger is activated or provoked and the data of the source table 170 that was updated is at that time and directly updated in the target table 180. When data in the source table 170 is deleted the deleted trigger is activated or provoked and the data of the source table 170 that was deleted is at that time and directly deleted in the target table 180 (to the extent that such data exists in the target table1 180).

In other embodiments, additional or different triggers are used to identify when data has been changed in the source table 170 to synchronously update the data in the target table 180.

The data replicator module 130 is configured to cause the at least one processor to replicate the data contained in the source table 170 in the target table 180. In some embodiments, the data replicator module 130 causes all of the records or data in the source table 170 to be copied to or replicated in the target table 180. Thus, while the table updater module 120 ensures that all data that is changed in the source table (modified data) gets moved or modified in the target table 180, the data replicator module 130 ensures that all records or data (including unmodified data) in the source table 170 get moved or replicated in the target table 180.

In one embodiment, the data replicator module 130 causes a "dummy update" (an update that does not change the data in the source table 170) to activate or provoke one of the triggers to cause a modification of the data in the target table 180.

The table replacer module 140 is configured cause the at least one processor to replace the source table 170 with the target table 180. For example, once the data replicator module 130 has completed the replication of all data contained in the source table 170 in the target table 180, the table replacer module 140 causes the users of the source table 170 to use the target table 180. For example, in some embodiments, the table replacer module 140 causes the processor to redirect the application structured query language (SQL) statements from the source table 170 to the target table 180. Thus, in some embodiments, the table replacer module 140 is configured to cause the applications that use the source table 170 to use the target table 180.

In some embodiments, the source table 170 can then be removed or otherwise deleted. In some embodiments, the table replacer module 140 causes the processor to remove or delete the source table 170 once the target table 180 is being used.

In some embodiments, it is necessary to lock the source table 170 while the table replacer module 140 causes the processor to replace the source table 170 with the target table 180. Thus, in such embodiments, for a period of time, the data in the source table 170 may not be modified or changed.

In some embodiments, rather than locking the data of the source table 170 while the table replacer module 140 causes the processor to replace the source table 170 with the target table 180, the changes made to the data in the target table 180 are synchronously replicated in the source table 170 (a bi-directional capture and replication process). Specifically, once the data replicator module 130 has completed the replication of all data contained in the source table 170 in the target table 180, the table replacer module 140 may begin to cause the processor to redirect individual instances of the application SQL statements from the source table 170 to the target table 180. Thus, the redirection process can occur individually as sessions expire. For example, as users complete a session of the application or complete a unit of work using the source table 170, they will then be redirected to the target table 180. The next time the user uses the application and accesses the table data the target table 180 will be accessed. As this redirection process may take some time and to avoid locking the data contained within the tables during this process, the bi-directional capture and replication process may be implemented.

In some embodiments, the table updater module 120 is configured to cause the processor to modify data in the source table 170 synchronously with data being updated or modified in the target table 180. For example, triggers, as described above, may be used to identify when data has been updated in the target table 180. Once a trigger is activated or provoked the corresponding data modification is made in the source table 170.

The bi-directional capture and replication process allows users to access and edit data in both the source table 170 and the target table 180 and the changes that are made by the users are synchronously made in both tables. In one embodiment, to avoid an endless loop of changes, only user initiated changes activate or provoke the triggers. In other words, for example, the synchronous modification of data in the source table 170 that is made in response to data being modified in the target table 180 would not activate or provoke the trigger (associated with the data being modified in the source table) to make another change of the data in the target table 180.

In one embodiment, to ensure that only one version of a particular data item in either the source table 170 and the target table 180 is being edited at one time, when a user is accessing data within one of the tables that data is locked in that table as well as the corresponding data in the other table. For example, when a user is editing data in the source table 170, that data in the source table 170 is locked and the corresponding data in the target table 180 is locked. This locking may be accomplished through a direct row lock propagation to the other table or by executing a dummy update on the data in the other table. Alternatively, the locking may be accomplished by another means.

In some embodiments, for example in systems that include source tables that do not include a built-in unique identifier for its rows, the system 100 includes a table mapper module 150. The table mapper module 150 is configured to cause the at least one processor to generate a mapping table. The mapping table unambiguously associates data of the source table with data in the target table. Thus, if the data in the source table and the data in the target table do not align, for example because of different columns or table organization, a mapping table may be created to unambiguously associate the data in the source table with data in the target table.

In some embodiments, the mapping table is a two column table. Each item of data or each cell in the source table is assigned a unique identifying number and each item of data or each cell in the target table is assigned a unique identifying number. In a two column table, the mapping table associates the unique identifying number of the data or cell of the source table with the unique identifying number of the data or cell of the target table. Thus, the data or cells of the source table are unambiguously associated with the data or cells of the target table.

In some embodiments, rather than a mapping table, the table mapper module 150 is configured to cause the at least one processor to add an identification row to the target table. The identification row may then be populated with data that unambiguously associates the data in the target table with the data in the source table. For example, the identification row in the target table may be populated with a unique row identification of the data in the source table. In other embodiments, another type of identification of the data in the source table populates the identification row in the target table.

Figure 2:
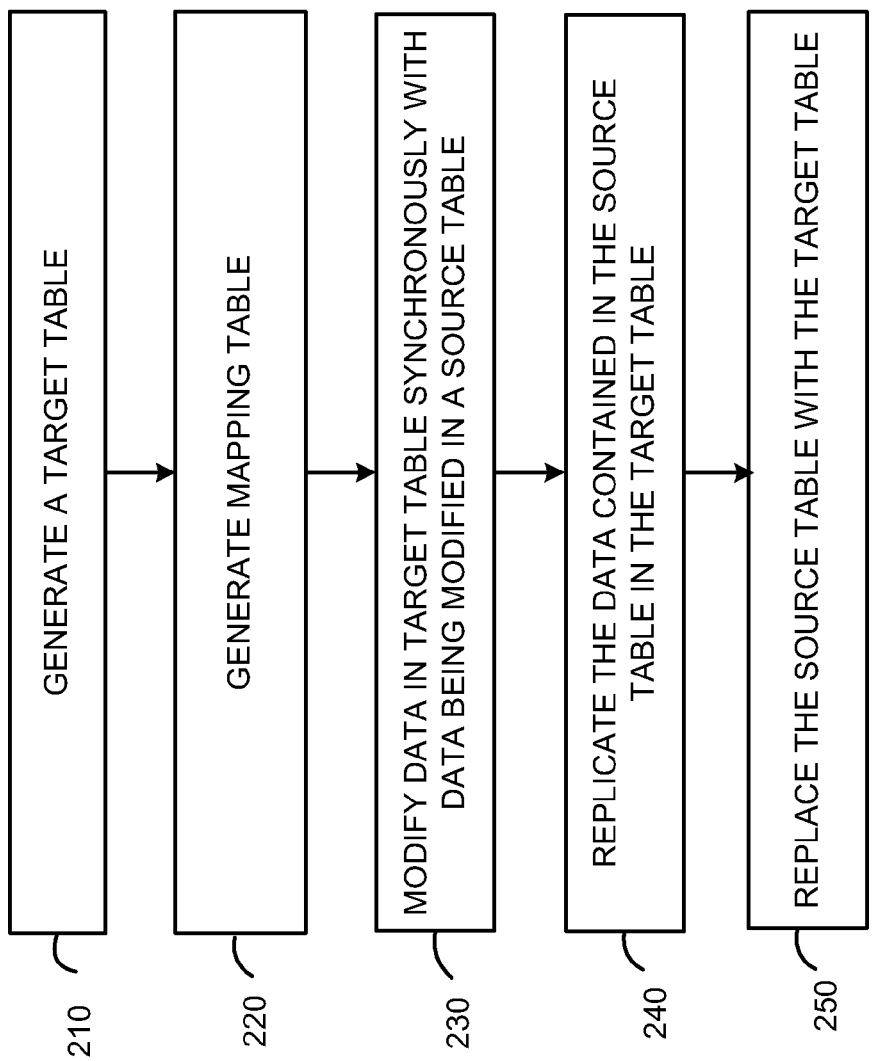
FIG. 2 is a flowchart illustrating example operations of the system of FIG. 1.

FIG. 2 is a flow chart illustrating example operations of the system 100 of FIG. 1. At step 210, a target table is generated. The target table may have different table attributes or data types than the source table. Additionally, the target table may be stored at a location that is different than the location where the source table is stored.

At step 220, a mapping table is generated. The mapping table unambiguously associates data or cells of the source table with data or cells of the target table.

At step 230, changes made to the source table are synchronously made in the target table. The changes that are made to the source table are synchronously made in the target table for the duration of the table move or reorganizing process. In other words, each time a change is made to the data in the source table, that change of data is made in the target table until the process is complete.

At step 240, the data in the source table is replicated in the target table. Once this step is completed, at step 250, the source table is replaced by the target table. Specifically, for example, in one embodiment, the applications that use the source table are directed to use the target table.

In some embodiments, once all of the data of the source table is replicated in the target table and while the applications are being directed to use the target table, the changes that are made to the target table by users of the target table are synchronously made in the data of the source table. For example, in cases where there are a large number of applications or users that need to be directed to use the target table rather than the source table, it can take some time to get all of the applications and/or users directed to the target table. In such cases, as some applications or users are directed to and use the target table, the changes that such users make to the data in the target table will be replicated and updated in the data of the source table.

In some embodiments, once the all of the applications that use the tables are directed to use the target table, the source table can be removed or deleted.

The methods and systems described above may be implemented on many different types of systems. For example, the methods may be implemented on an IBM DB2 for Linux system, UNIX, and Windows®. Additionally, the methods may be implanted on low level database engine replay mechanisms.

Example 1

Figure 3:
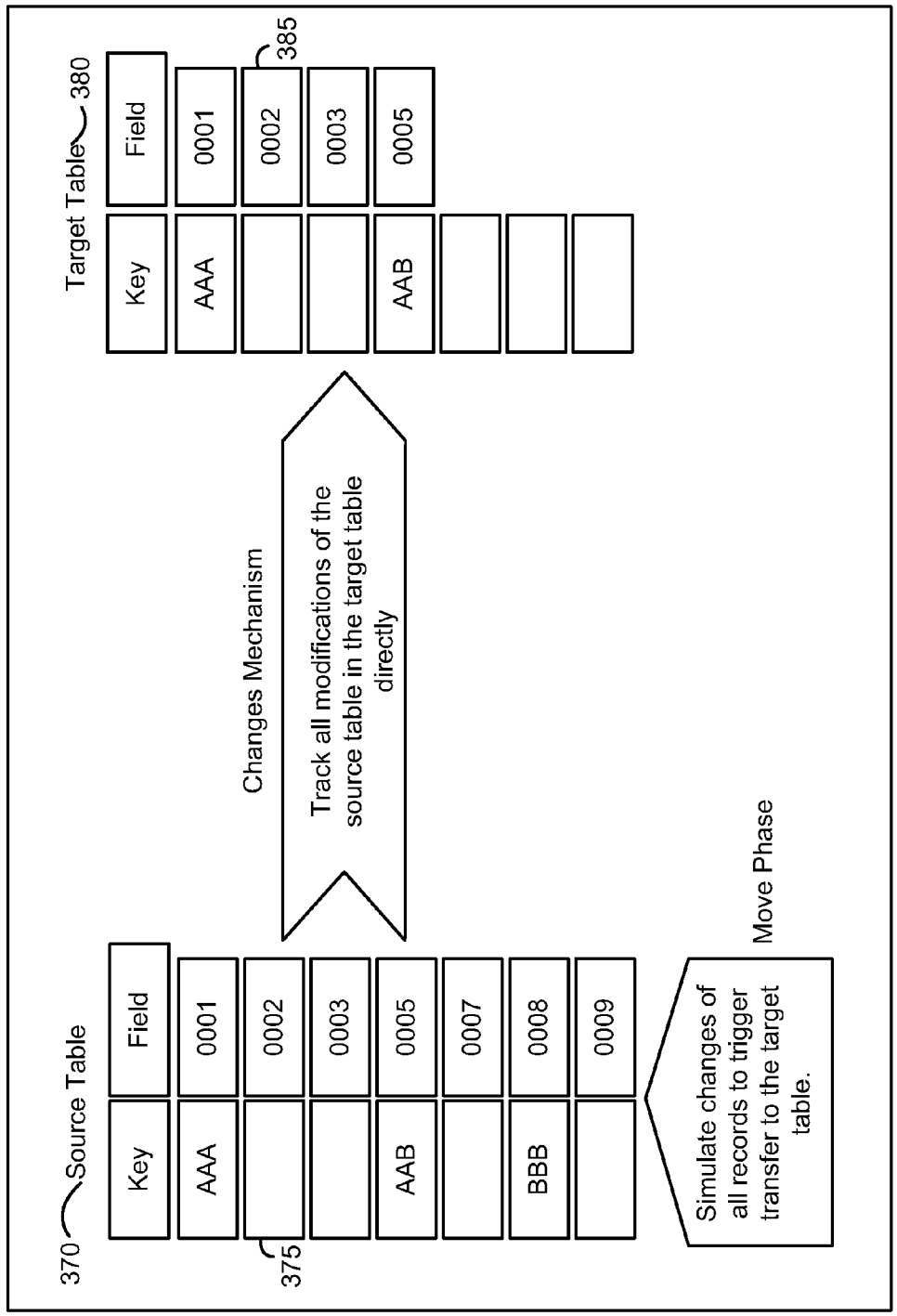
FIG. 3 is a schematic diagram illustrating a first example process or implementation employed by the system of FIG. 1.

FIG. 3 is a schematic diagram illustrating a first example process or implementation employed by the system of FIG. 1. In this example, a target table 380 is generated. The data 375 that is changed in the source table 370 is synchronously made in the data 385 of the target table 380. During the move phase, all of the data 375 of source table 370 is replicated in the data 385 of the target table 380. Although the source table 370 and the target table 380 are illustrated as having two columns, in other embodiments, the source table 370 and the target table 380 have any number of columns.

This example is based on the use of triggers for an IBM DB2 for Linux, UNIX and Windows®. For this example, a source table 370 and a target table 380 have a unique index. For example, the following method may be used.

```
Create table ST ( key int, field varchar(8) )
Create unique index STI on ST ( key )
insert into ST values (1, '00000001')
insert into ST values (2, '00000002')
....
insert into ST values (1, '99999999')
```

In the next step of the example process or implementation, the target table 380 is created by the table generator module 110. The target table may have the same structure as source table 370. The target table 380 may be given storage attributes that are different than the storage attributes of the source table 370. Additionally the target table 380 may store data types that differ from the data types stored by the source table 370. The following method may be used.

```
Create table TT ( key int, field varchar(8) )
Create unique index TTI on TT ( key )
```

In the next step, the table updater module ensures that all of the changes made to the source table 370 are transferred or made in the target table 380. Triggers are created on the source table 370 that redo or transfer the changes immediately to the target table 380. The following pseudo code describes the trigger definitions.

```
INSERT ST   → IF row not exists in TT   →   { INSERT row into TT }
    create trigger ST_INS after insert on ST referencing new as N for
    each row insert
into TT values ( N.key, N.field)
```

```
UPDATE ST →  IF row exists in TT   →   { UPDATE row in TT }
        ELSE       →   { INSERT row into TT }
    create trigger ST_UPD after update on ST referencing new as N for
    each row
begin atomic delete from TT T where T.key = N.key;
    insert into TT values ( N.key, N.field);
    end
DELETE ST   →   IF row exists in TT   → { DELETE row from TT }
    create trigger ST_DEL after delete on ST referencing old as O for
    each row
    delete from TT T where T.key = O.key
UPDATE KEY ST → IF row exists in TT → { DELETE row from TT }
    create trigger ST_UPDK after UPDATE of KEY on ST referencing
    old as O for
each row delete from TT T where T.key = O.key
```

In the next step, the data replicator module 130 ensures that all records or data in the source table 370 are moved or transferred to the target table 380. In this implementation, only triggers cause data to be moved or transferred to the target table 380. Otherwise, in some cases, it might be necessary to include a lock/wait situation on the target table 380. In this example, all records of the source table 370 are identified and a "dummy update" (or an update that includes no new or modified data in the source table 370) is executed on the source table 370 causing the update trigger which then replicates the data from the source table 370 to the target table 380. For the sake of clarity, the "dummy update" can be an update that does not change the data or content of the source table 370. The following method may be used to create the "dummy update."

update ST set field=field where key=<key>

In the final step of this example, the table replacer module 140 replaces the source table 370 with the target table 380. Once the data contents of the source table 370 and the target table 380 are identical, incoming changes to the source table 370 are still replicated in the target table 370 by the defined triggers. The source table 370 can then be replaced by the target table 380. In some cases, this requires a short time period when both the data of the source table 370 and the data of the target table 380 are locked. Once the locks are in place, the triggers can be dropped and the target table 380 can replace the source table 370. The following method may be followed.

```
drop table ST
rename table TT to ST
```

Example 2

Figure 4:
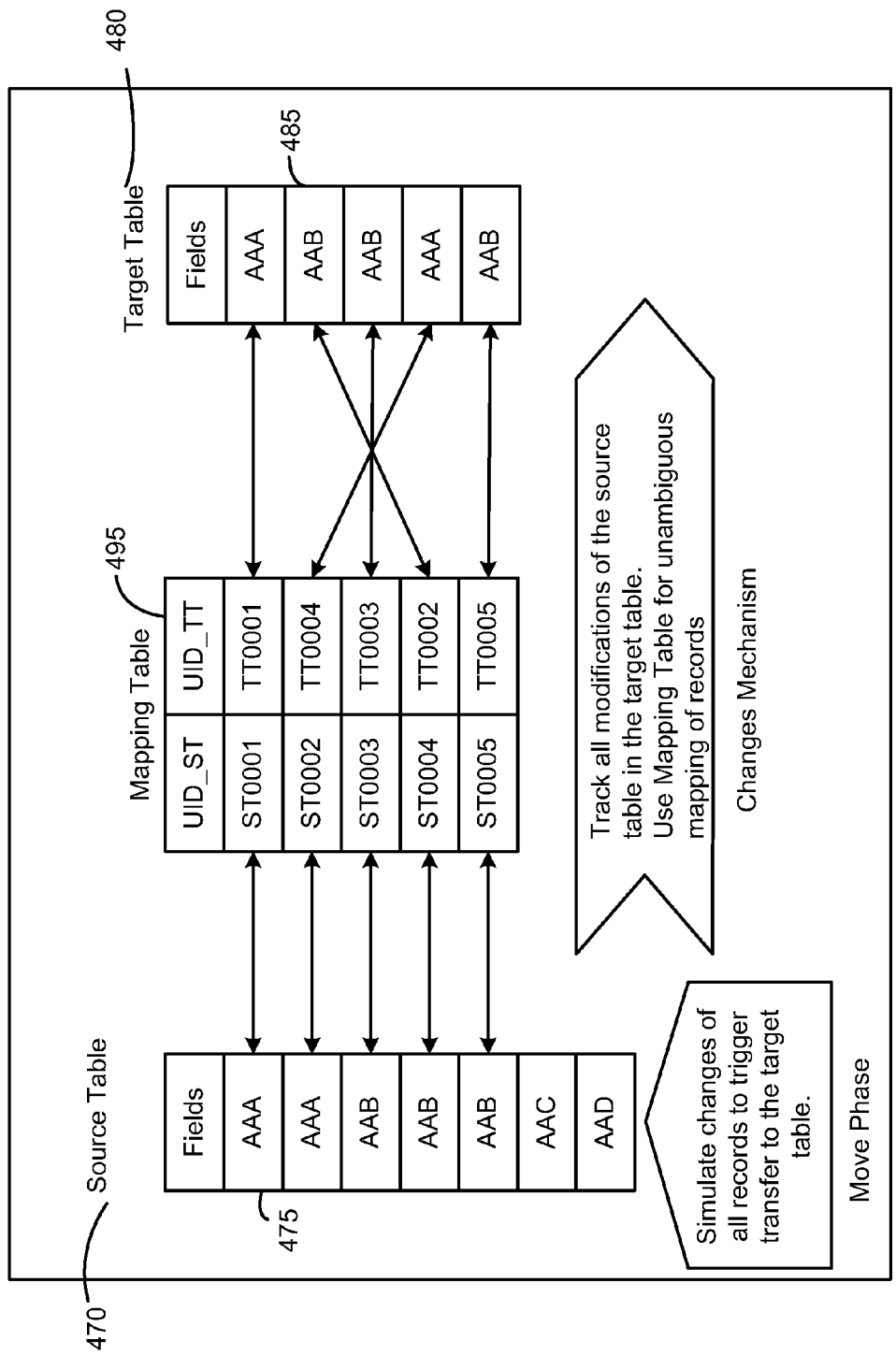
FIG. 4 is a schematic diagram illustrating a second example process or implementation of the system of FIG. 1.

FIG. 4 is a schematic diagram illustrating a second example process or implementation employed by the system of FIG. 1. In this example, a target table 480 is generated. A mapping table 495 is generated to unambiguously map data 475 of the source table 470 with data 485 of the target table 480. The data 475 that is changed in the source table 470 is synchronously made in the data 485 of the target table 480. During the move phase, all of the data 475 of source table 470 is replicated in the data 485 of the target table 480. Although the source table 470 and the target table 480 are illustrated as having two columns, in other embodiments, the source table 470 and the target table 480 have any number of columns.

This example is an example based on the use of triggers and row identifications for an Oracle 10 database. The system of FIG. 1 and alternative implementations thereof, however, may be implemented using other techniques including, for example, low level database engine mechanisms.

This implementation example uses two tables, a source table 470 and a target table 480 that do not have a unique index. The following methods may be followed.

```
create table ST ( field char(32) );
insert into ST values
    ('AAAAAAAAAAAAAAAAAAAAAAAAAAAAAAAA');
insert into ST values
    ('AAAAAAAAAAAAAAAAAAAAAAAAAAAAAAAA');
insert into ST values
    ('AAAAAAAAAAAAAAAAAAAAAAAAAAAAAAAB');
insert into ST values
    ('AAAAAAAAAAAAAAAAAAAAAAAAAAAAAAAB');
    ....
insert into ST values
    ('ZZZZZZZZZZZZZZZZZZZZZZZZZZZZZZZZ');
```

The table generator module 110 then generates a target table 380. The following method can be used.

create table TT (field char(32));

The table mapper module 150 may then create a mapping table and a unique index to unambiguously associate data from the source table with data of the target table. The below method can be used.

create table STM (uid_st rowid, uid_tt rowid);
create unique index STMI on STM (uid_st);

In the next step, the table updater module 120 ensures that all of the changes made to the source table 470 are transferred or made in the target table 480. Triggers are created on the source table 470 that redo or transfer the changes immediately to the target table 480. The following pseudo code describes the trigger definitions.

```
INSERT ST → IF row not exists in TT    →  { INSERT row into TT}
                                          { INSERT pair of identifiers
                                          into STM}
UPDATE ST →  IF row exists in TT       →  { UPDATE row in TT}
                                          { UPDATE pair of identifiers
                                          into STM}
             ELSE                      →  { INSERT row into TT}
                                          { INSERT pair of identifiers
                                          into STM}
DELETE ST → IF row exists in TT        →  { DELETE row from TT}
                                          { DELETE pair of identifiers
                                          from STM}
create or replace trigger TST after insert or update or delete
on ST referencing old as o new as n for each row
declare
    uid_st_n rowid := :n.rowid;
    uid_st_o rowid := :o.rowid;
    uid_tt_l rowid;
begin
        if inserting then
        insert into TT values (:n.field) returning rowid into uid_tt_l;
        insert into STM values (uid_st_n, uid_tt_l);
        end if;
        if updating then
        begin
        select uid_tt into uid_tt_l from STM where uid_st = uid_st_o;
        delete from TT where rowid = uid_tt_l;
        delete from STM where uid_st = uid_st_o;
        insert into TT values (:n.field) returning rowid into uid_tt_l;
        insert into STM values (uid_st_n, uid_tt_l);
        end;
        end if;
if deleting then
        begin
        select uid_tt into uid_tt_l from STM where uid_st = uid_st_o;
        delete from TT where rowid = uid_tt_l;
        delete from STM where uid_st = uid_st_o;
        end;
end if;
    end TST;
```

In the next step, the data replicator module 130 ensures that all records or data in the source table 470 are moved or transferred to the target table 480. In this implementation, only triggers cause data to be moved or transferred to the target table 480. Otherwise, in some cases, it might be necessary to include a lock/wait situation on the target table 480. In this example, all records of the source table 470 are identified and a "dummy update" (or an update that includes no new or modified data in the source table 470) is executed on the source table 470 causing the update trigger which then replicates the data from the source table 470 to the target table 480. For the sake of clarity, the "dummy update" can be an update that does not change the data or content of the source table 470. The following method may be used to create the "dummy update."

update ST set field=field;

In the final step of this example, the table replacer module 140 replaces the source table 470 with the target table 480. Once the data contents of the source table 470 and the target table 480 are identical, incoming changes to the source table 470 are still replicated in the target table 480 by the defined triggers. The source table 470 can then be replaced by the target table 480. In some cases, this requires a short time period when both the data of the source table 470 and the data of the target table 480 are locked. Once the locks are in place, the triggers can be dropped and the target table 480 can replace the source table 470. The following method may be followed.

```
                                    INSERT ST  → IF row not exists in TT → { INSERT row into
TT }
                      UPDATE ST →   IF row exists in TT → { UPDATE row in TT }
                                       ELSE       →       { INSERT row into TT }
                      DELETE ST →   IF row exists in TT   →   { DELETE row from TT }
                      create or replace trigger TST after insert or update or delete
                      on ST referencing old as o new as n for each row
                         declare
                                  o_auid rowid := :o.rowid;
                                  n_auid rowid := :n.rowid;
                         begin
                              if inserting then
                      insert into tt values (:n.field, n_auid);
                                   end if;
                                   if updating then
                         begin
                                       delete from TT where auid = o_auid;
                                       insert into tt values (:n.field, n_auid);
                                          end;
                                   end if;
                                   if deleting then
                                          delete from TT where auid = o_auid;
                      end if;
                      end TST;
```

```
           lock table ST in exclusive mode;
           drop table ST;
           drop table STM;
           rename TT to ST;
```

Example 3

This example is an example based on the use of triggers and row identifications for an Oracle 10 database. Instead of creating a separate mapping table, a special RowID column is added to the target table. This column is used to store the corresponding RowIDs of the source table. Once the process is completed (after the table move or reorganization is completed) the RowID column in the target table may be removed.

This implementation example uses two tables, a source table and a target table that do not have a unique index. The following methods may be followed.

```
       create table ST ( field char(32) );
       insert into ST values
       ('AAAAAAAAAAAAAAAAAAAAAAAAAAAAAAAA');
       insert into ST values
       ('AAAAAAAAAAAAAAAAAAAAAAAAAAAAAAAA');
       insert into ST values
       ('AAAAAAAAAAAAAAAAAAAAAAAAAAAAAAAB');
       insert into ST values
       ('AAAAAAAAAAAAAAAAAAAAAAAAAAAAAAAB');
          ....
       insert into ST values
       ('ZZZZZZZZZZZZZZZZZZZZZZZZZZZZZZZZ');
```

The table generator module 110 then generates a target table. Additionally, a RowID column (AUID) is added to the target table. The following method can be used.
   create table TT (field char(32), uui rowid);
   create unique index TTI on TT (uid);

In the next step, the table updater module 120 ensures that all of the changes made to the source table are transferred or made in the target table. Specifically, triggers are created on the source table that redo or transfer the changes immediately to the target table. The following pseudo code describes the trigger definitions.

In the next step, the data replicator module 130 ensures that all records or data in the source table are moved or transferred to the target table. In this implementation, only triggers cause data to be moved or transferred to the target table. Otherwise, in some cases, it might be necessary to include a lock/wait situation on the target table. In this example, all records of the source table are identified and a "dummy update" (or an update that includes no new or modified data in the source table) is executed on the source table causing the update trigger which then replicates the data from the source table to the target table. For the sake of clarity, the "dummy update" can be an update that does not change the data or content of the source table. The following method may be used to create the "dummy update."
   update ST set field=field;

In the final step of this example, the table replacer module 140 replaces the source table with the target table. Once the data contents of the source table and the target table are identical, incoming changes to the source table are still replicated in the target table by the defined triggers. The source table can then be replaced by the target table. In some cases, this requires a short time period when both the data of the source table and the data of the target table are locked. Once the locks are in place, the triggers can be dropped and the target table can replace the source table. The following method may be followed.

```
           lock table ST in exclusive mode;
           alter table TT drop column AUID;
           drop table ST;
           rename TT to ST;
```

Example 4

Figure 5:
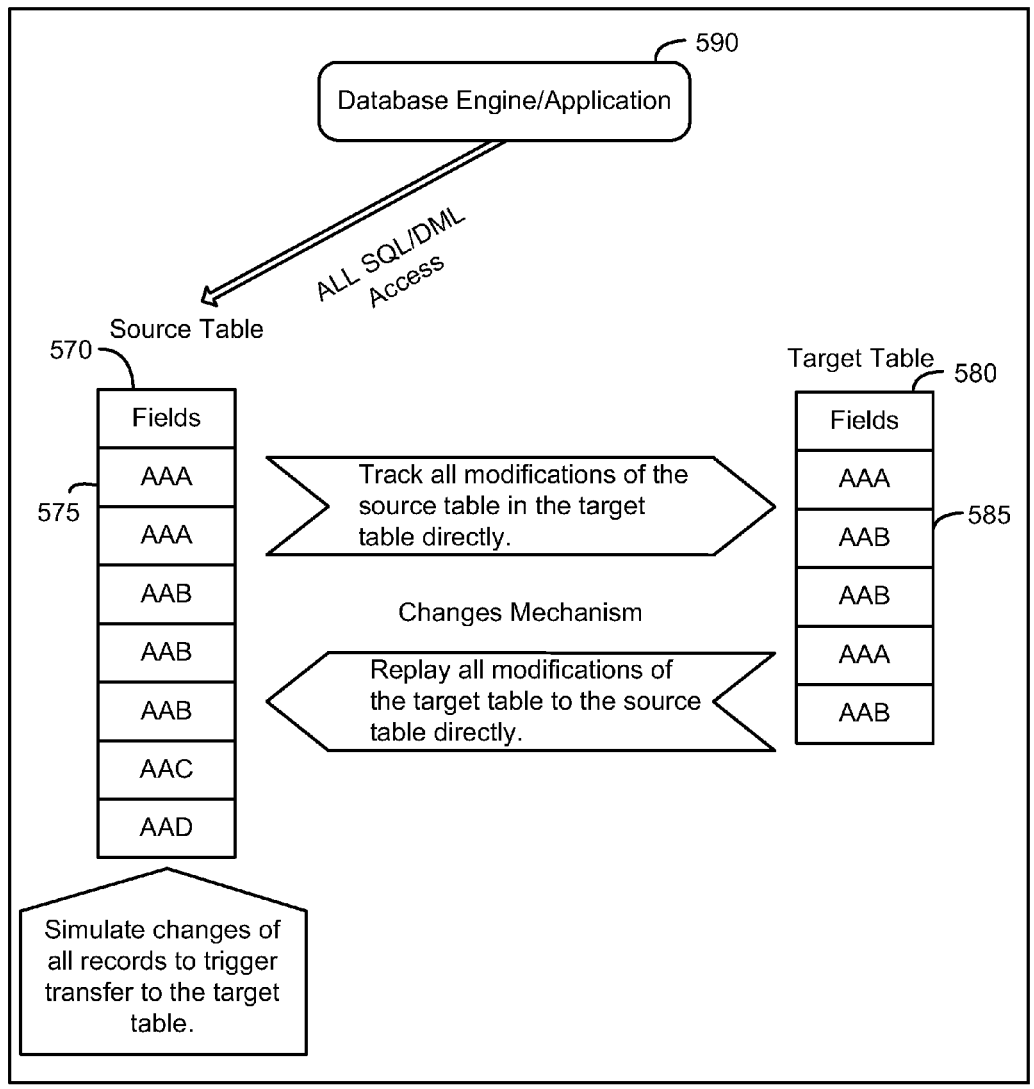
FIGS. 5-7 are schematic diagrams illustrating a third example process or implementation of the system of FIG. 1.
Figure 6:
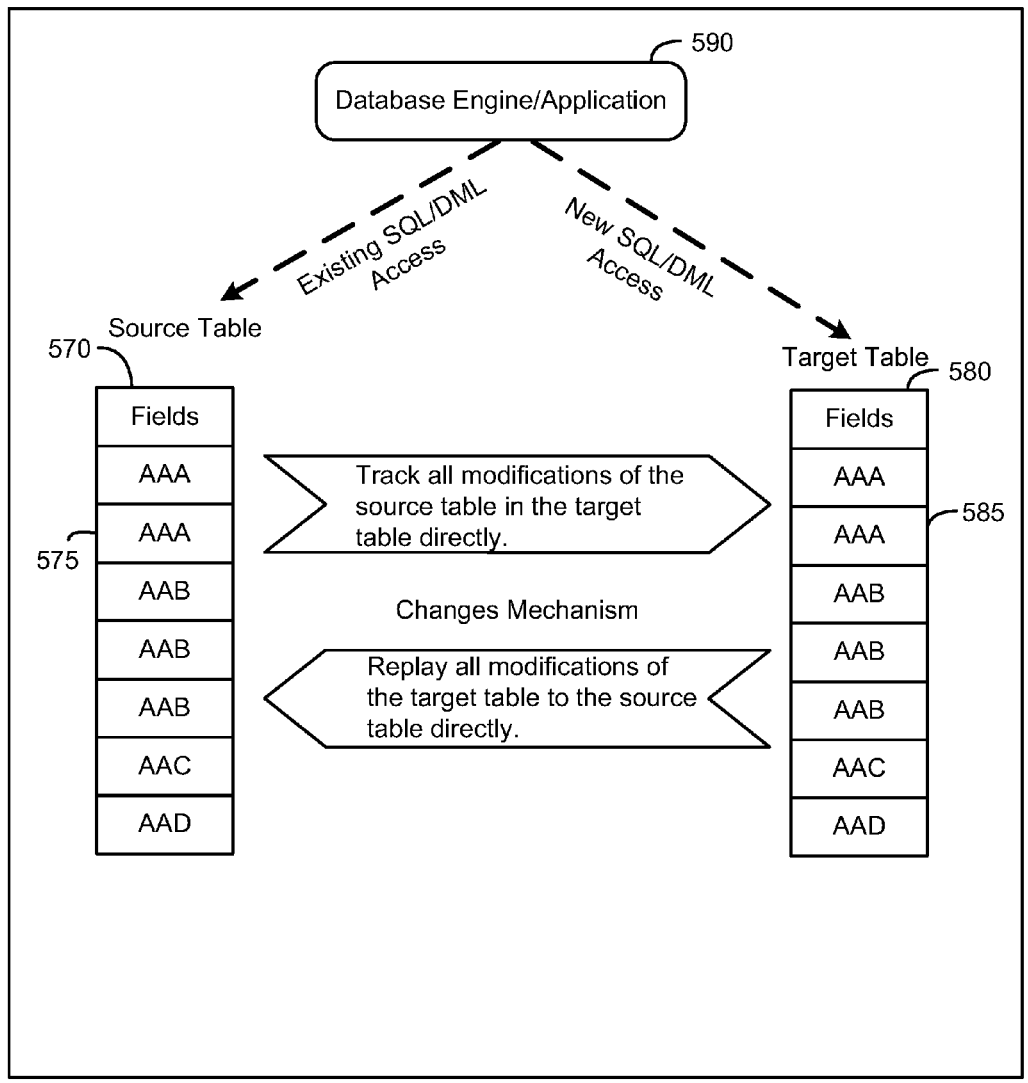
Figure 7:
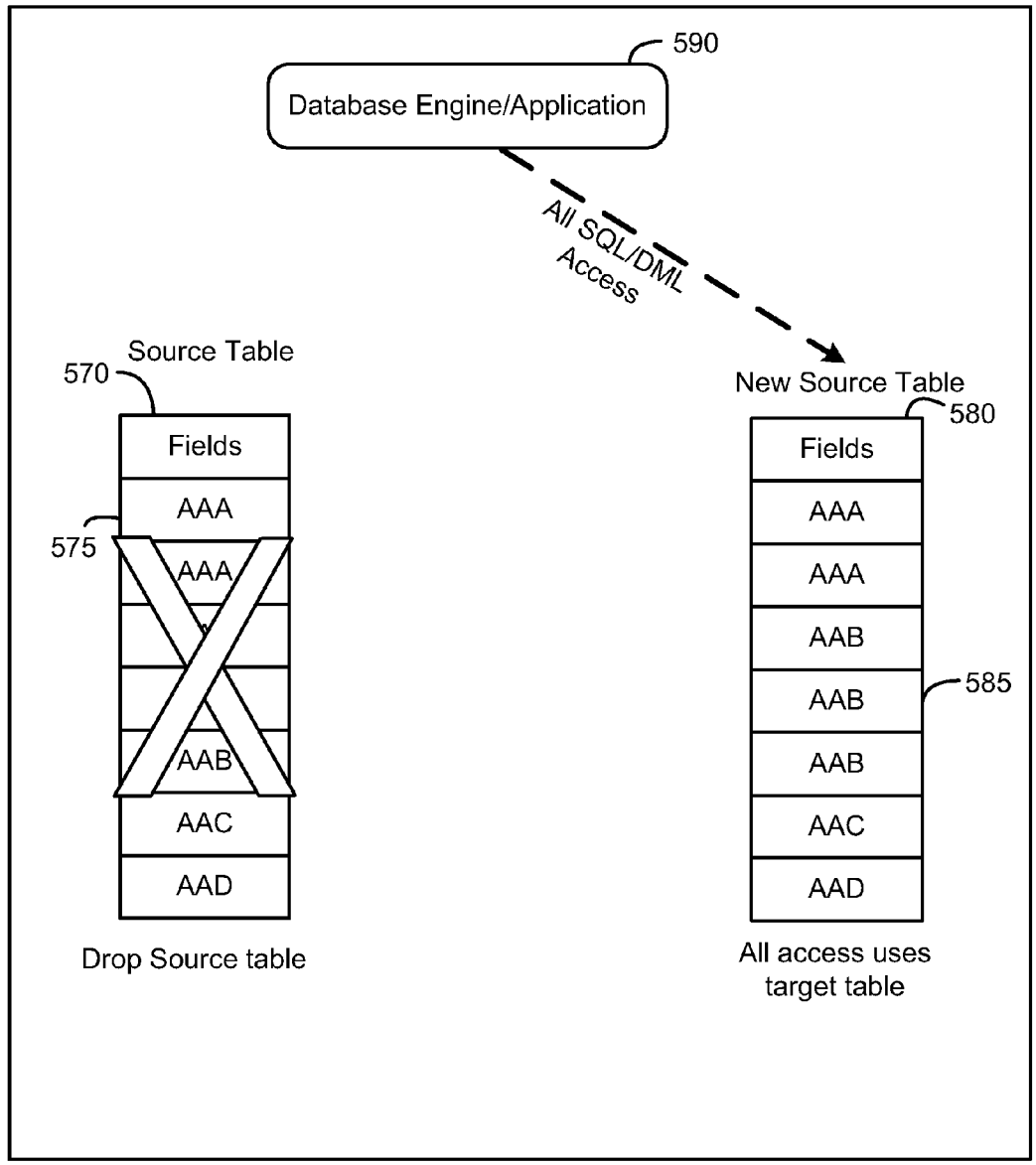

FIGS. 5-7 illustrate a fourth example process or implementation employed by the system of FIG. 1. In this example, a bi-directional capture and replication process is implemented.

As illustrated in FIG. 5, similar to the above examples, a target table 580 is created, changes to data in the source table 570 are synchronously made in the target table 580, and all data in the source table 570 is transferred to the target table 580.

The target table 580 is created by the table generator module 110. The target table may have the same structure as the source table 570. The target table 580 may be given storage attributes that are different than the storage attributes of the source table 570. Additionally the target table 580 may store data types that differ from the data types stored by the source table 570.

Then, as described in the above examples, the table updater module 120 ensures that all of the changes made to the data 575 of the source table 570 are transferred or made in the data 585 of the target table 580. Specifically, triggers are created on the source table 570 that redo or transfer the changes immediately to the target table 580.

The data replicator module 130 ensures that all records or data in the source table 570 are moved or transferred to the target table 580. In this example, all records of the source table 570 are identified and a "dummy update" (or an update that includes no new or modified data in the source table 570) is executed on the source table 570 causing the update trigger which then replicates the data from the source table 570 to the target table 580. For the sake of clarity, the "dummy update" can be an update that does not change the data or content of the source table 570.

As illustrated in FIG. 6, the source table 570 is then replaced by the target table 580. In this example, the table replacer module 140 replaces the source table 570 with the target table 580. Once the data contents of the source table 570 and the target table 580 are identical, the data base engine or applications 590 can be directed to the target table 580 rather than the source table 570. In this example, each user of the application is directed to the target table 580 when that user completes a session of the application. Accordingly, the next time the user begins a session the application will be directed to the target table 580. This allows for a more seamless transition from the source table 570 to the target table 580 and eliminates the need for to lock the source table 570 during this replacement step.

In this example, during the redirection of the applications from the source table 570 to the target table 580, a bi-directional capture and replication is implemented. Specifically, the user initiated changes to the data in both the source table 570 and the target table 580 are replicated synchronously in the other table.

In some embodiments, triggers, as described above, are used to identify when data in the target table 580 is modified and edits to the data 575 of the source table 570 need to be made. In other embodiments, other mechanisms are used to indicate when a change in the data of the target table 580 has been made.

As the data in both the source table 570 and the target table 580 stays up-to-date, there is no need to lock the data of either table during the replacement of the source table with the target table. In this example, when one user is modifying the data in one of the tables, that data in that table and the associated data in the other table are locked so that multiple edits of the same data cannot be made at the same time.

As illustrated in FIG. 7, once all of the sessions are directed to the target table 580, the source table 570 can be removed.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions recorded on a non-transitory computer-readable storage medium and readable by at least one processor, the system comprising:
    a table generator module configured to cause the at least one processor to generate a target table for reorganizing physical storage of data in a source table, the target table including table storage attributes that are different than table storage attributes of the source table;
    a table updater module configured to cause the at least one processor to directly modify data in the target table synchronously with data being modified in a the source table,
    wherein the table updater module is configured to cause the at least one processor to update data in the source table synchronously with data being updated in the target table;
    a data replicator module configured to cause the at least one processor to replicate, in the target table, the data contained in the source table with the table storage attributes that are different than table storage attributes of the source table; and
    a table replacer module configured to cause the at least one processor to:
        replace the source table with the target table without relying on a staging table after the data in the source table is replicated in the target table,
        redirect an application statement from the source table to the target table while maintaining access to the source table, and
        after redirecting the application statement, change access to the target table, and delete the source table.

2. The computer system of claim 1, wherein table updater module is configured to cause the at least one processor to modify data in the target table in response to a trigger being satisfied.

3. The computer system of claim 1, wherein the table updater module is configured to cause the at least one processor to modify data in the target table in response to data being added, deleted, or changed in the source table.

4. The computer system of claim 1, further comprising:
    a table mapper module configured to cause the at least one processor to generate a mapping table.

5. The computer system of claim 1, further comprising: a table mapper module configured to cause the at least one processor to generate a mapping table, the mapping table unambiguously maps data of the source table with data of the target table.

6. The computer system of claim 1, further comprising: a table mapper module configured to cause the at least one processor to generate a mapping table, the mapping table having a first unique identifier associated with a second unique identifier, the first unique identifier uniquely identifying data in the source table, the second unique identifier uniquely identifying data in the target table.

7. The computer system of claim 1, wherein the target table includes a storage attribute that is different than a storage attribute of the source table.

8. The computer system of claim 1, wherein the source table is stored in a first memory, the table generator module is configured to generate and store the target table in a second memory different than the first memory.

9. The computer system of claim 1, wherein the redirecting is performed after replication of the data has been completed by the data replicator module.

10. The computer system of claim 1, wherein the application statement is an structured query language statement configured to operate on the source table.

11. The computer system of claim 1, wherein the source table is stored in a first memory, the table generator module is configured to generate and store the target table in a second memory different than the first memory, the table replacer module is configured to cause the at least one processor to remove the source table from the first memory.

12. A computer-implemented method for causing at least one processor to execute instructions recorded on a non-transitory computer-readable storage medium, the method comprising:
    generating a target table for reorganizing physical storage of data in a source table, the target table including table storage attributes that are different than table storage attributes of the source table;
    directly modifying data in the target table synchronously with data being modified in the source table;
    modifying data in the source table synchronously with data being updated in the target table;
    replicating the data contained in the source table in the target table with the table storage attributes that are different than table storage attributes of the source table;
    replacing the source table with the target table without relying on a staging table after the data in the source table is replicated in the target table;
    redirecting an application statement from the source table to the target table while maintaining access to the source table; and
    after redirecting the application statement, changing access to the target table, and deleting the source table.

13. The computer-implemented method of claim 12, wherein the data in the target table is modified in response to data being added, deleted, or changed in the source table.

14. The computer-implemented method of claim 12, further comprising: generating a mapping table.

15. The computer-implemented method of claim 12, further comprising:
    generating a mapping table that unambiguously maps data of the source table with data of the target table.

16. A computer program product, the computer program product being tangibly embodied on a non-transitory computer-readable medium and comprising instructions that, when executed, are configured to cause at least one processor to:
    generate a target table for reorganizing physical storage of data in a source table, the target table including table storage attributes that are different than table storage attributes of the source table;
    directly modify data in the target table synchronously with data being modified in a the source table;
    modify data in the source table synchronously with data being updated in the target table;

replicate the data contained in the source table in the target table with the table storage attributes that are different than table storage attributes of the source table;

replace the source table with the target table without relying on a staging table after the data in the source table is replicated in the target table;

redirect an application statement from the source table to the target table while maintaining access to the source table; and after redirecting the application statement, change access to the target table, and delete the source table.

17. The computer program product of claim 16, further comprising instructions that, when executed, are configured to cause the at least one processor to:

generate a mapping table that unambiguously maps data of the source table with data of the target table.

* * * * *